(12) United States Patent
Ben-Yair et al.

(10) Patent No.: US 9,746,920 B2
(45) Date of Patent: *Aug. 29, 2017

(54) DETERMINING ERRORS IN FORMS USING EYE MOVEMENT

(71) Applicant: International Business Machines Corporation, Armonk, NY (US)

(72) Inventors: Yoav Ben-Yair, Mevaseret Zion (IL); Gil Fuchs, Mevaseret Zion (IL); Itai Gordon, Jerusalem (IL); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,489

(22) Filed: Aug. 25, 2015

(65) Prior Publication Data

US 2017/0060232 A1 Mar. 2, 2017

(51) Int. Cl.
| | |
|---|---|
| *G06F 3/01* | (2006.01) |
| *G06K 9/00* | (2006.01) |
| *G06F 17/24* | (2006.01) |
| *G06F 17/27* | (2006.01) |
| *G06F 3/0481* | (2013.01) |

(52) U.S. Cl.
CPC ............ *G06F 3/013* (2013.01); *G06F 3/0481* (2013.01); *G06F 17/243* (2013.01); *G06F 17/27* (2013.01); *G06K 9/00335* (2013.01); *G06K 9/00604* (2013.01)

(58) Field of Classification Search
CPC ......... G06F 3/013; G06F 17/27; G06F 17/243
See application file for complete search history.

(56) References Cited

U.S. PATENT DOCUMENTS

| | | | |
|---|---|---|---|
| 8,619,095 B2 | 12/2013 | Jaramillo et al. | |
| 9,256,784 B1* | 2/2016 | Taylor | G06K 9/00597 |
| 2003/0028792 A1* | 2/2003 | Plow | G06F 17/243 |
| | | | 713/193 |
| 2011/0201387 A1* | 8/2011 | Paek | G06F 3/0237 |
| | | | 455/566 |
| 2012/0106793 A1 | 5/2012 | Gershenson et al. | |
| 2013/0097480 A1* | 4/2013 | Allison | G06Q 10/10 |
| | | | 715/223 |
| 2013/0145304 A1 | 6/2013 | DeLuca et al. | |
| 2013/0235073 A1 | 9/2013 | Jaramillo et al. | |

(Continued)

FOREIGN PATENT DOCUMENTS

WO 2014052891 A1 4/2014

OTHER PUBLICATIONS

Arieli et al.; "Tracking fairness considerations and choice procedures"; pp. 1-20.

(Continued)

*Primary Examiner* — Ryan A Lubit
(74) *Attorney, Agent, or Firm* — Lance I. Hochhauser

(57) ABSTRACT

Tracking eye movement during the completion of a form on a mobile computing device to determine possible errors and suggest changes to the form. To improve data quality, eye-tracking data is used to determine input fields on a form that cause issues for a user; based on the eye tracking data, suggestions are made to change a response or to modify the form.

17 Claims, 2 Drawing Sheets

(56) References Cited

U.S. PATENT DOCUMENTS

2014/0310256 A1 10/2014 Olsson et al.
2014/0361996 A1 12/2014 Eden et al.

OTHER PUBLICATIONS

Bojko et al.; "Eye Tracking and Usability Testing in Form Layout Evaluation"; BFMA; Proceedings of the 39th International Symposium of Business Forms Management Association (BFMA); pp. 1-13.
Majaranta, Paivi; "Gaze Interaction and Applications of Eye Tracking: Advances in Assistive Technologies"; Medical Information Science Reference; 2012; 398 pages.
Tan et al.; "Error Recovery in a Blended Style Eye Gaze and Speech Interface"; ICMI' 03; Nov. 5-7, 2003; Vancouver, British Columbia, Canada; Copyright © 2003, ACM; pp. 196-202.
List of IBM Patents or Patent Applications Treated as Related (Appendix P), filed herewith, 2 pages.
U.S. Appl. No. 14/970,800, filed Dec. 16, 2015—This Document is Not Provided Because it is Readily Available to the Examiner.
Ben-Yair et al., "Improving Data Quality for Forms Completed on Mobile Computing Devices", U.S. Appl. No. 15/372,487, filed Dec. 8, 2016, 23 pages.
IBM, Appendix P, List of IBM Patents or Patent Applications Treated as Related, dated Dec. 8, 2016, 2 pages.
Ben-Yair et al., "Improving Data Quality for Forms Completed on Mobile Computing Devices", U.S. Appl. No. 15/339,962, filed Nov. 1, 2016, 22 pages.
IBM, Appendix P, List of IBM Patents or Patent Applications Treated as Related, dated Nov. 1, 2016, 2 pages.

\* cited by examiner

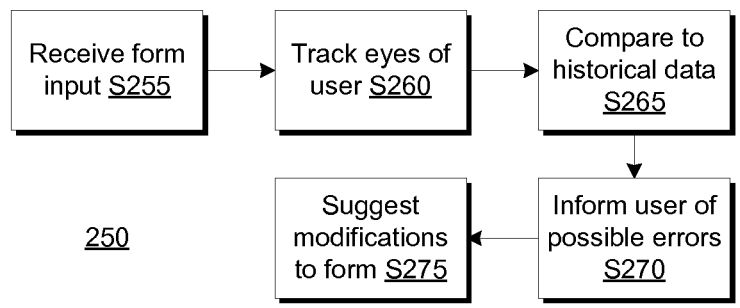
Fig. 2
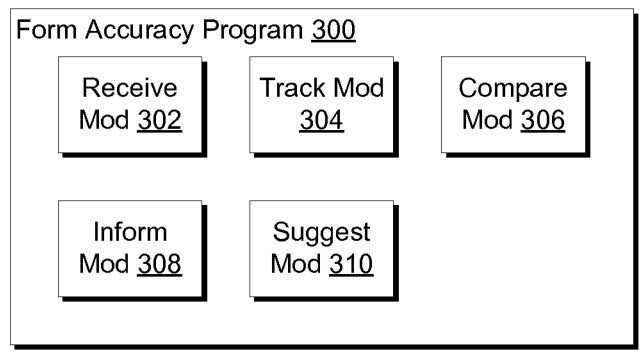
Fig. 3
Driver 1 Name: <u>Abel</u>
Roadway Name: <u>First Avenue</u>
Direction of Travel: ● North
○ East  ○ South  ○ West
Driver 2 Name: <u>Bob</u>
Roadway Name: <u>Main Street</u>
Direction of Travel: ● North
○ East  ○ South  ○ West
Time of Incident: - <u>11:30 pm</u> +
Weather: ■ Sun ☐ Rain ☐ Snow
☐ Sleet ☐ Hail ☐ Clouds ■ Clear
216
Fig. 4

DETERMINING ERRORS IN FORMS USING EYE MOVEMENT

BACKGROUND

The present invention relates generally to the field of data processing, and more particularly to help presentations within an operator interface.

Entities use forms for a variety of purposes (e.g., employment questionnaires, satisfaction surveys, internal reporting, etc.). Many entities are increasingly employing forms that users can complete on a mobile computing device. However, form inputs generally include errors when completed by using a mobile computing device, such as a smartphone.

Eye tracking technology enables measurement of the direction of an individual's gaze. Some mobile computing devices have incorporated eye-tracking technology.

SUMMARY

According to an aspect of the present invention, there is a method, computer program product, and/or system that performs the following operations (not necessarily in the following order): (i) receiving a set of responses to a set of input fields in a form; (ii) tracking a set of eye movements, across the form, of a user correlating to receipt of the set of responses; and (iii) informing the user of a set of possible errors in the set of responses. The set of possible errors is based, at least in part, on the set of responses and the set of eye movements. At least tracking a set of eye movements is performed by computer software running on computer hardware.

BRIEF DESCRIPTION OF THE DRAWINGS

FIG. 2 is a flowchart showing a first embodiment method performed, at least in part, by the first embodiment system;

FIG. 3 is a block diagram view of a machine logic (e.g., software) portion of the first embodiment system; and FIG. 4 is a screenshot view of a form to be completed on a second embodiment of a system according to the present invention.

DETAILED DESCRIPTION

Figure 1:
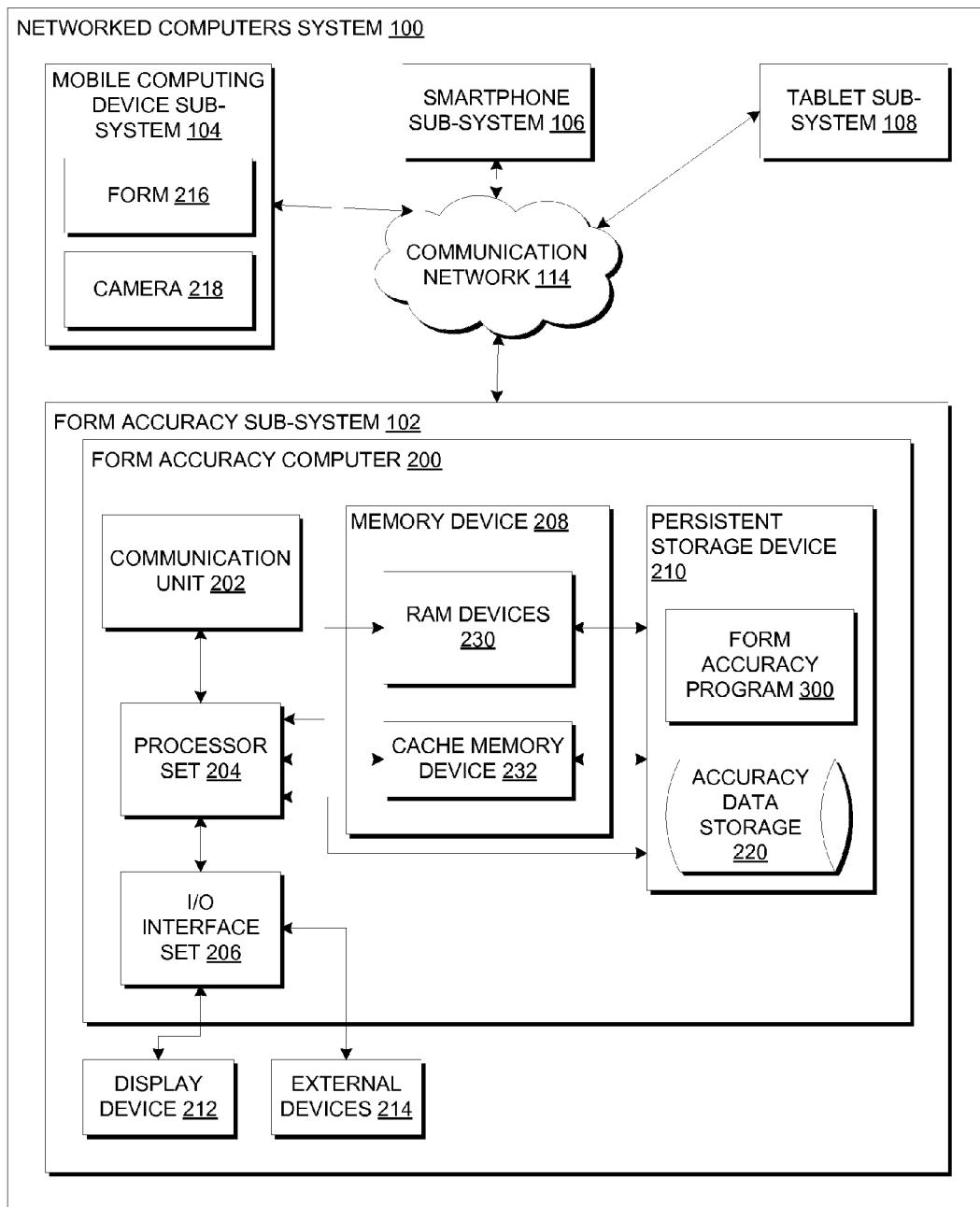
FIG. 1 is a block diagram view of a first embodiment of a system according to the present invention.

Tracking eye movement during the completion of a form on a mobile computing device to determine possible errors and suggest changes to the form. To improve data quality, eye-tracking data is used to determine input fields on a form that cause issues for a user; based on the eye tracking data, suggestions are made to change a response or to modify the form. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: form accuracy sub-system 102; mobile computing device sub-system 104; smartphone sub-system 106; tablet sub-system 108; and communication network 114. Form accuracy sub-system 102 contains: form accuracy computer 200; display device 212; and external devices 214. Form accuracy computer 200 contains: communication unit 202; processor set 204; input/output (I/O) interface set 206; memory device 208; and persistent storage device 210. Memory device 208 contains: random access memory (RAM) devices 230; and cache memory device 232. Persistent storage device 210 contains: accuracy data storage 220; and form accuracy program 300. Mobile computing device sub-system 104 contains: form 216; and camera 218.

Form accuracy sub-system 102 is, in many respects, representative of the various computer sub-systems in the present invention. Accordingly, several portions of form accuracy sub-system 102 will now be discussed in the following paragraphs.

Form accuracy sub-system 102 may be a laptop computer, a tablet computer, a netbook computer, a personal computer (PC), a desktop computer, a personal digital assistant (PDA), a smart phone, or any programmable electronic device capable of communicating with the client sub-systems via communication network 114. Form accuracy program 300 is a collection of machine readable instructions and/or data that is used to create, manage, and control certain software functions that will be discussed in detail, below, in the Example Embodiment sub-section of this Detailed Description section.

Form accuracy sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Form accuracy sub-system 102 is shown as a block diagram with many double arrows. These double arrows (no separate reference numerals) represent a communications fabric, which provides communications between various components of form accuracy sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for form accuracy sub-system 102; and/or (ii) devices external to form accuracy sub-system 102 may be able to provide memory for form accuracy sub-system 102.

Form accuracy program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Form accuracy program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to form accuracy sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with form accuracy computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., form accuracy program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

Form 216 (FIG. 4) is a document or other software that requires a user to provide inputs. Form 216 can include a variety of methods of input including, but not limited to: checkboxes; combo boxes; date pickers; drop-down lists; list boxes; radio buttons; sliders; spinners; and/or text boxes.

Camera 218 is a component of mobile computing device sub-system 104. Camera 218 can be any component capable of tracking eye movements of a user while the user is completing form 216 on mobile computing device sub-system 104. Camera 218 can be a photographic camera, a video camera, a movie camera, or any other device capable of recording images of eye movement. Additionally, camera 218 can be any other device capable of detecting eye movement of a user. One configuration for camera 218 is to be a "front-facing" camera (i.e., a camera pointing at a user while the user is viewing a screen on mobile computing device sub-system 104). Camera 218 can be integrated into mobile computing device sub-system 104. Alternatively, camera 218 can be a component external to mobile computing device sub-system 104.

Accuracy data storage 220 is a persistent storage device where inputs to form 216 are stored. Accuracy data storage 220 can store inputs to form 216 in a variety of manners including, but not limited to, by: user; form type; and input method type.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

FIG. 2 shows flowchart 250 depicting a method according to the present invention. FIG. 3 shows form accuracy program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, a police officer, Jane, is investigating a traffic incident at an intersection and, as part of her duties, is completing form 216 (FIGS. 1 and 4) on mobile computing device sub-system 104. Form 216 contains a variety of input fields (sometimes called entry fields), including, but not limited to: checkboxes; radio buttons; and text boxes.

Processing begins at operation S255, where receive module ("mod") 302 receives a set of form inputs. In this example, Jane is completing form 216 to describe a two-car accident at the intersection of Main Street and First Avenue. Jane uses the different input fields on form 216, such as driver name (a text box) and direction of travel (a set of radio buttons) to describe the incident. Receive mod 302 receives as an input from Jane that the first car, driven by Abel, was traveling north on First Avenue and that the second car, driven by Bob, was traveling south on Main Street. Jane has also input the time (a spinner) and the weather conditions (a set of checkboxes). Receive mod 302 receives as an input from Jane that the accident occurred at 11:30 pm and that the weather was clear and sunny. In some embodiments of the present invention, receive mod 302 stores a set of inputs to accuracy data storage 220.

Processing proceeds to operation S260, where track mod 304 tracks a user's eye movement during completion of a form. In this example, Jane completes form 216 on mobile computing device sub-system 104, a smartphone that includes camera 218 (FIG. 1). While Jane completes form 216, track mod 304 tracks Jane's eye movement over form 216. Track mod 304 determines that Jane's eyes: (i) lingered on the driver name input fields for approximately ten seconds each, while also intermittently turning away from form 216; (ii) only stayed on the direction of travel input field for three seconds each, while briefly turning away from form 216; (iii) stayed on the time input field for five seconds, but included a three minute gap during which Jane was not looking at form 216; and (iv) lingered on the weather conditions for ten seconds. Alternatively, the software used to track eye movement is stored on the smartphone.

Processing proceeds to operation S265, where compare mod 306 compares a set of form inputs and a set of tracking data to a set of historical data. In this example, compare mod 306 compares the inputs received from Jane and the tracking data of Jane's eyes to historical data stored in accuracy data storage 220. Compare mod 306 determines: (i) a variety of previous errors relate to direction of travel, noting that Jane described an accident occurring at an intersection with Abel and Bob traveling in opposite directions, not intersecting directions; (ii) some previous errors relate to weather conditions, noting that Jane described an incident occurring at 11:30 pm, but the weather was sunny; and (iii) a significant portion of previous errors relate to distractions, noting that Jane did not look at form 216 for three minutes while selecting the time.

Processing proceeds to operation S270, where inform mod 308 informs a user of possible errors during completion of a form. In this example, inform mod 308 informs Jane of three possible errors received in operation S255 during Jane's completion of form 216. Jane confirms that Able was traveling north on First Avenue and Bob was traveling south on Main Street; the roads intersect at an acute angle, but generally run parallel. Jane also confirms that it was sunny at the time of the accident, but revises the time input field, changing the time of the incident from 11:30 pm to 11:30 am. Alternatively, inform mod 308 automatically adjusts a set of inputs received in operation S255 based, at least in part, on a set of data tracked during operation S260 and a set of historical data stored in accuracy data storage 220. In some embodiments of the present invention, inform mod 308 adjusts a set of inputs to conform with a set of historical data stored in accuracy data storage 220.

Processing terminates at operation S275, where suggest mod 310 suggests modifications to a form. In this example, suggest mod 310 suggests modifications to form 216 based, at least in part, on the interaction with Jane, stored in accuracy data storage 220. Suggest mod 310 suggests a clarification to the direction of travel input field; the suggestions are: (i) add an input field specifying the general direction of travel on the roadway, distinct from the direction of travel input field; (ii) add a compass to form 216 to more accurately state the direction of travel; and (iii) if a user looks away from form 216 for more than 15 seconds, highlight the last input field at which the user looked.

III. Further Comments and/or Embodiments

Some embodiments of the present invention recognize the following facts, potential problems, and/or potential areas for improvement with respect to the current state of the art: (i) conventional technology is unable to determine a cause of an error in a form; (ii) conventional technology is unable to correct an error in a form in real-time; and/or (iii) conventional technology is unable to suggest improvements to a form to decrease the occurrence of errors.

Some embodiments of the present invention may include one, or more, of the following features, characteristics, and/or advantages: (i) determining a cause of an error in a form; (ii) correcting an error in a form in real-time; and/or (iii) suggesting improvements to a form to decrease the occurrence of errors.

Some embodiments of the present invention improve data quality of forms completed on mobile computing devices using eye-tracking information. Some embodiments of the present invention analyze a root cause of a data entry error and/or problem in data quality in forms completed on a mobile computing device. Some embodiments of the present invention provide solutions to data entry errors and/or problems in data quality by suggesting corrections to the user in real-time. Some embodiments of the present invention improve data quality by suggesting modifications to and/or modifying a form.

Some embodiments of the present invention notify a user about a common error made in the completion of a form based, at least in part, on stored historical data regarding, (i) the form, and (ii) eye-tracking data related to completion of the form. Some embodiments of the present invention modify a form and/or options within a form based difficulty experienced by a user. Some embodiments of the present invention suggest the addition and/or adjustment of tools on a mobile computing device to improve a user experience in completing a form and/or decrease difficulty experienced by a user.

In some embodiments of the present invention, a form accuracy sub-system notifies a user of a common error based on completion of an input field on a form and suggests a change in the response to the input field. In some embodiments of the present invention, a form accuracy sub-system determines a potential error in an input field based, at least in part, on an eye gesture of a user indicating uncertainty on the part of the user. In some embodiments of the present invention, eye tracking measures gestures of an eye or the eyes of a user. In some embodiments of the present invention, gestures of an eye include, but are not limited to: (i) time of viewing; (ii) hesitations; (iii) doubts; (iv) rapid movement; and/or (v) speed of scanning. In some embodiments of the present invention, input fields on a form include, but are not limited to: (i) checkboxes; (ii) combo boxes; (iii) date pickers; (iv) drop-down lists; (v) list boxes; (vi) radio buttons; (vii) sliders; (viii) spinners; and/or (ix) text boxes. In some embodiments of the present invention, a form accuracy sub-system determines response options between which a user debated. In some embodiments of the present invention, a form accuracy sub-system selects a different action based on an incorrect response to an input field based, at least in part, on a set of incorrect options considered by a user.

One example of an input field in which a user may show uncertainty is a request for a direction (e.g., north versus south). In this example, a form accuracy sub-system determines based, at least in part, on a set of eye tracking data that the user debated between selecting north and selecting south. After reviewing historical data related to the form, the form accuracy sub-system notifies the user of a potential error in this input field, and suggests the user consult a compass and confirm the response. The form accuracy sub-system further notifies the creator of the form and suggests inclusion of a compass widget on the form to aid users and improve data quality. Alternatively, the form accuracy sub-system creates a rule for the form requiring future users to consult a compass and confirm their responses to that input field.

In some embodiments of the present invention, a form accuracy sub-system stores eye-tracking data about a user with data about a form the user completed. In some embodiments of the present invention, a form accuracy sub-system analyzes stored eye-tracking data to correct errors in a form. In some embodiments of the present invention, a form accuracy sub-system analyzes stored eye-tracking data to complete omitted input fields in a form. In some embodiments of the present invention, a form accuracy sub-system improves accuracy of inputs to a form by identifying an omitted response in a set of responses. In some embodiments of the present invention, a form accuracy sub-system determines a correct response to an input field based on eye-tracking data from a user. In some embodiments of the present invention, a form accuracy sub-system infers intentions of a user with regard to responses to an input field based, at least in part, on eye-tracking data. In some embodiments of the present invention, a form accuracy sub-system offers guidance to a user based on prior responses to an input field and/or eye-tracking data.

Some embodiments of the present invention interpret eye-tracking data. Some embodiments of the present invention change a form or a response to an input field based, at least in part, on eye-tracking data. Some embodiments of the present invention detect potential unintentional user input by determining that the user responded to an input field at which the user was not looking. Some embodiments of the present invention adjust mobile computing device content characteristics (e.g., typeface, font size, etc.) based, at least in part, on eye-tracking data (e.g., squinting, rubbing eyes with a hand, blinking, etc.). Some embodiments of the present invention evaluate a quality of a layout of a form (e.g., alignment of input fields, type of input field, etc.) based, at least in part, on eye-tracking data and an error rate for responses.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
   receiving a set of responses to a set of input fields in a form;
   identifying, while receiving the set of responses, a set of eye movements of a user in relation to the form;
   correlating the set of eye movements to the set of responses;
   determining a set of possible errors in the set of responses based, at least in part, on the set of responses and the set of eye movements, wherein:
     the set of possible errors includes an omitted response in the set of responses, and
     the set of eye movements includes a hesitation; and
   suggesting a set of modifications to the form, but not the set of responses, based, at least in part, on the set of possible errors;
   wherein:
     at least identifying a set of eye movements of a user in relation to the form is performed by computer software running on computer hardware.

2. The method of claim 1, further including:
   informing the user of the set of possible errors.

3. The method of claim 1, further including:
   storing the set of eye movements with the form as a historical data in a set of historical data.

4. The method of claim 1, wherein determining the set of possible errors includes:
   comparing a set of historical data for the form to the set of responses and the set of eye movements.

5. The method of claim 4, further including:
   modifying the omitted response based, at least in part, on the set of historical data and the set of eye movements.

6. The method of claim 1, further including:
   modifying a response in the set of responses based, at least in part, on the set of possible errors.

7. A computer program product comprising:
   a computer readable storage medium having stored thereon:
     first instructions executable by a device to cause the device to receive a set of responses to a set of input fields in a form;
     second instructions executable by a device to cause the device to identify, while receiving the set of responses, a set of eye movements of a user in relation to the form;
     third instructions executable by a device to cause the device to correlate the set of eye movements to the set of responses;
     fourth instructions executable by a device to cause the device to determine a set of possible errors in the set of responses based, at least in part, on the set of responses and the set of eye movements, wherein:
       the set of possible errors includes an omitted response in the set of responses, and
       the set of eye movements includes a hesitation; and
     fifth instructions executable by a device to cause the device to suggest a set of modifications to the form, but not the set of responses, based, at least in part, on the set of possible errors.

8. The computer program product of claim 7, further including:
   sixth instructions executable by a device to cause the device to inform the user of the set of possible errors.

9. The computer program product of claim 7, further including:
   sixth instructions executable by a device to cause the device to store the set of eye movements with the form as a historical data in a set of historical data.

10. The computer program product of claim 7, wherein fourth instructions to determine the set of possible errors includes:
    sixth instructions executable by a device to cause the device to compare a set of historical data for the form to the set of responses and the set of eye movements.

11. The computer program product of claim 7, further including:
    sixth instructions executable by a device to cause the device to modify a response in the set of responses based, at least in part, on the set of possible errors.

12. A computer system comprising:
    a processor set; and
    a computer readable storage medium;
    wherein:
      the processor set is structured, located, connected, and/or programmed to execute instructions stored on the computer readable storage medium; and
      the instructions include:
        first instructions executable by a device to cause the device to receive a set of responses to a set of input fields in a form;
        second instructions executable by a device to cause the device to identify while receiving the set of responses, a set of eye movements of a user in relation to the form;
        third instructions executable by a device to cause the device to correlate the set of eye movements to the set of responses;
        fourth instructions executable by a device to cause the device to determine a set of possible errors in the set of responses based, at least in part, on the set of responses and the set of eye movements, wherein:
          the set of possible errors includes an omitted response in the set of responses, and
          the set of eye movements includes a hesitation; and
        fifth instructions executable by a device to cause the device to suggest a set of modifications to the form, but not the set of responses, based, at least in part, on the set of possible errors.

13. The computer system of claim 12, further including:
    sixth instructions executable by a device to cause the device to inform the user of the set of possible errors.

14. The computer system of claim 12, further including:
    sixth instructions executable by a device to cause the device to store the set of eye movements with the form as a historical data in a set of historical data.

15. The computer system of claim 12, wherein fourth instructions to determine the set of possible errors includes:
    sixth instructions executable by a device to cause the device to compare a set of historical data for the form to the set of responses and the set of eye movements.

16. The computer system of claim 12, further including:
    sixth instructions executable by a device to cause the device to modify a response in the set of responses based, at least in part, on the set of possible errors.

17. The computer program product of claim 10, further including:

seventh instructions executable by a device to cause the device to modify the omitted response based, at least in part, on the set of historical data and the set of eye movements.

* * * * *